United States Patent

[11] 3,616,083

| [72] | Inventor | Johannes Mohr<br>Oberboihingen, Germany |
|---|---|---|
| [21] | Appl. No. | 757,866 |
| [22] | Filed | Sept. 6, 1968 |
| [45] | Patented | Oct. 26, 1971 |
| [73] | Assignee | Karl M. Reich Maschinenfabrik<br>Nuertingen, Germany |
| [32] | Priority | Sept. 9, 1967 |
| [33] | | Germany |
| [31] | | P 15 86 253.0 |

[54] APPARATUS FOR PRODUCING FASTENER STRIPS
15 Claims, 21 Drawing Figs.

[52] U.S. Cl........................................ 156/513,
156/552, 206/56 DF, 53/196
[51] Int. Cl....................................... B32b 31/10,
B65d 83/02
[50] Field of Search............................ 156/513,
250, 522, 510, 552, 353, 355, 552; 93/58.6;
206/56 DF

[56] References Cited
UNITED STATES PATENTS

| 3,315,436 | 4/1967 | Baum et al.............. | 156/522 X |
| 3,342,659 | 9/1967 | Baum et al.............. | 156/306 X |
| 3,401,072 | 9/1968 | Pearson.................. | 156/250 |
| 3,471,008 | 10/1969 | Reich et al............. | 206/56 DF |

Primary Examiner—Benjamin A. Borchelt
Assistant Examiner—James M. Hanley
Attorney—Arthur O. Klein ABSTRACT: A machine for mass-producing fastener strips and especially nail strips for mailing machines fully automatically and continuously. The machine consists of a combination of different means for aligning the fasteners to form a continuous row, for conveying them in a step-by-step movement at a fixed distance from each other, for heating them, for connecting them to each other by means of thin connecting strips which are coated with a thermoplastic adhesive, for pressing the connecting strips and the intermediate row of fasteners together and for thereafter cooling them, for perforating the connecting strips between the adjacent fasteners, and for cutting the continuously produced fastener strip into sections of a certain length.

PATENTED OCT 26 1971 3,616,083
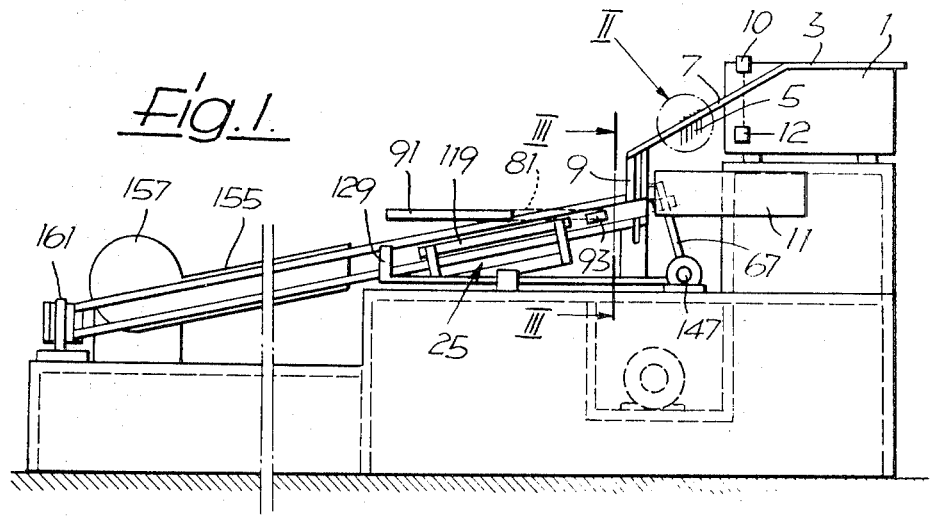
Fig. 1.
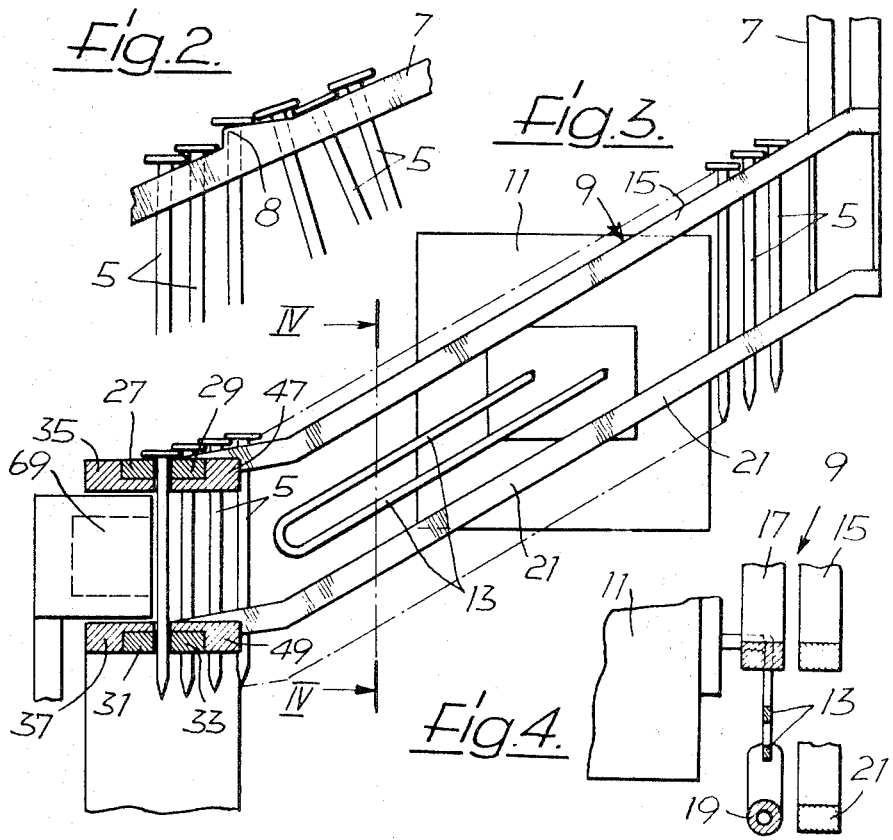
Fig. 2.
Fig. 3.
Fig. 4.
Inventor:
Johannes MOHR
by: Arthur O. Klein
his Attorney

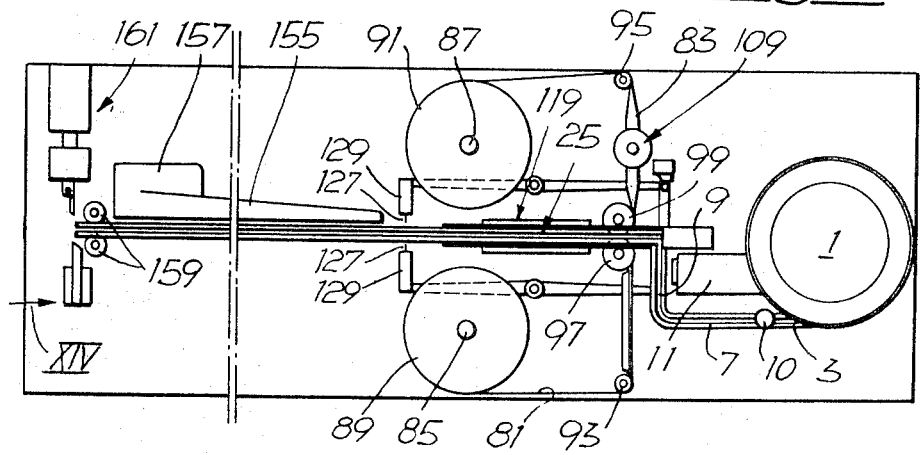
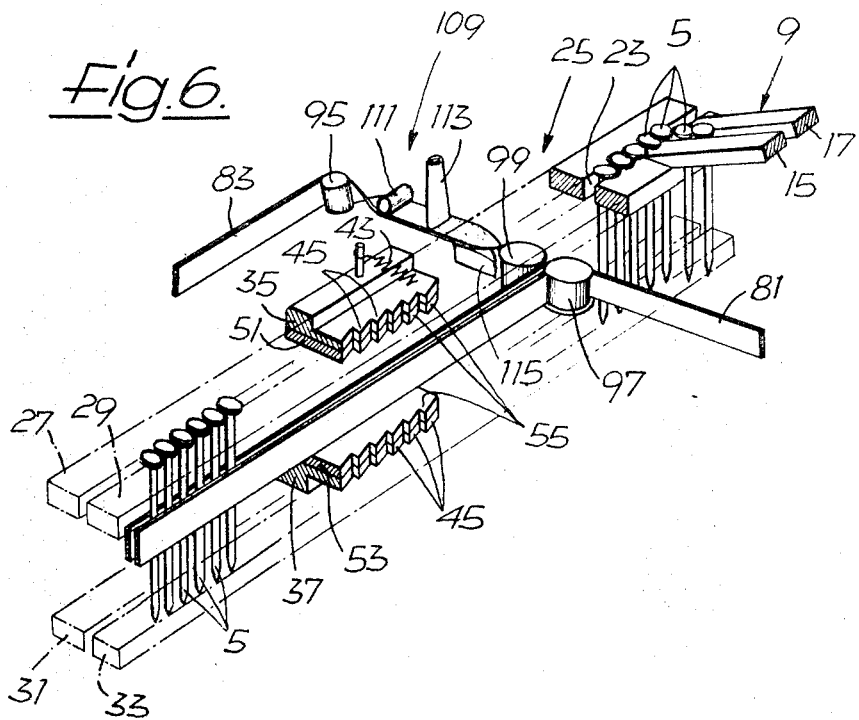

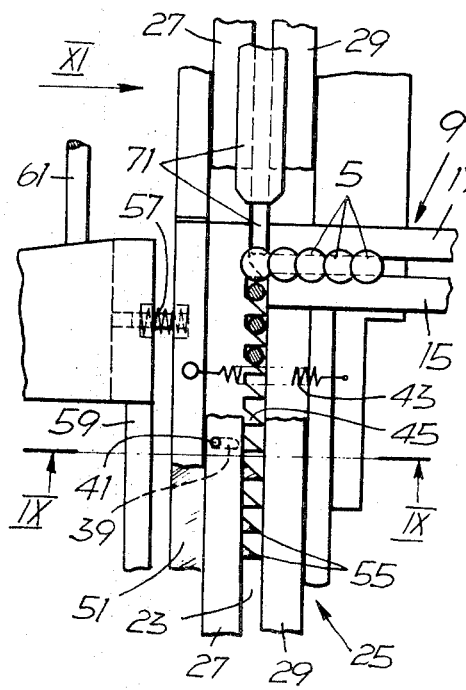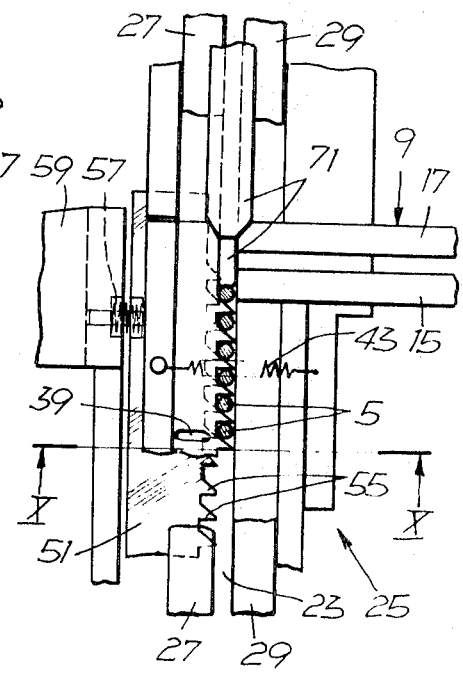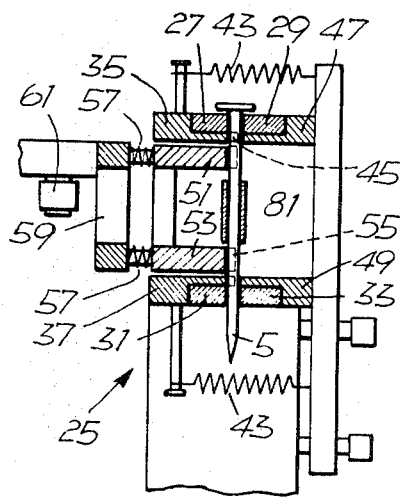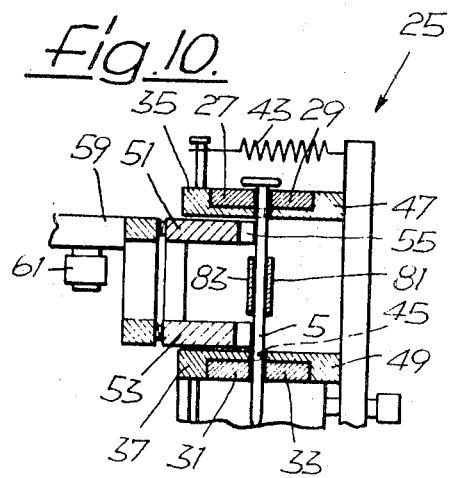

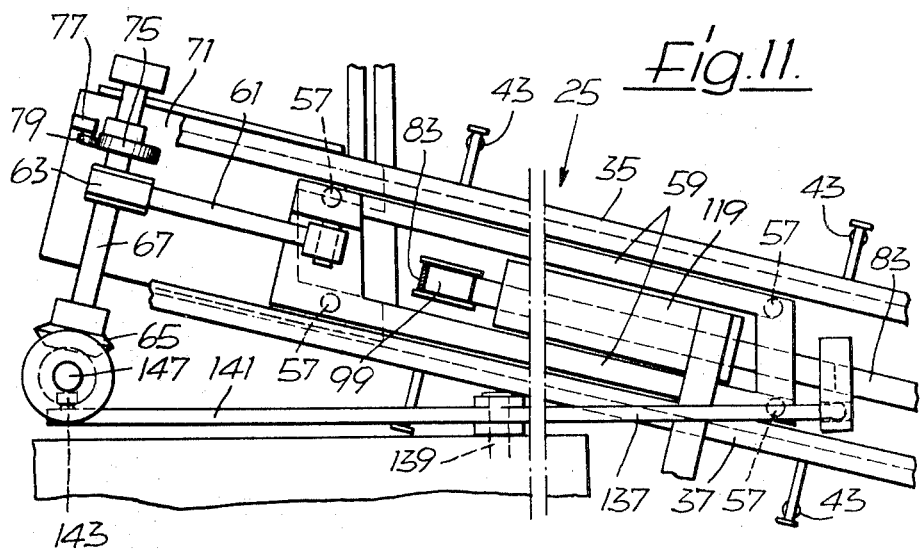
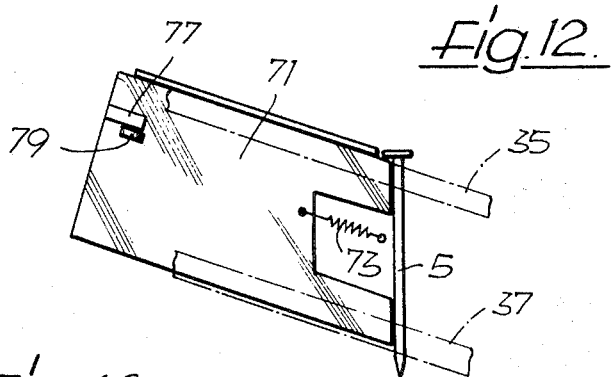
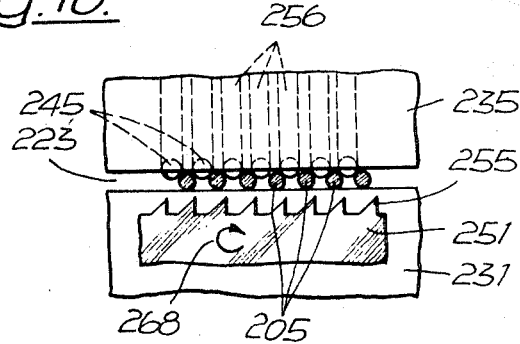

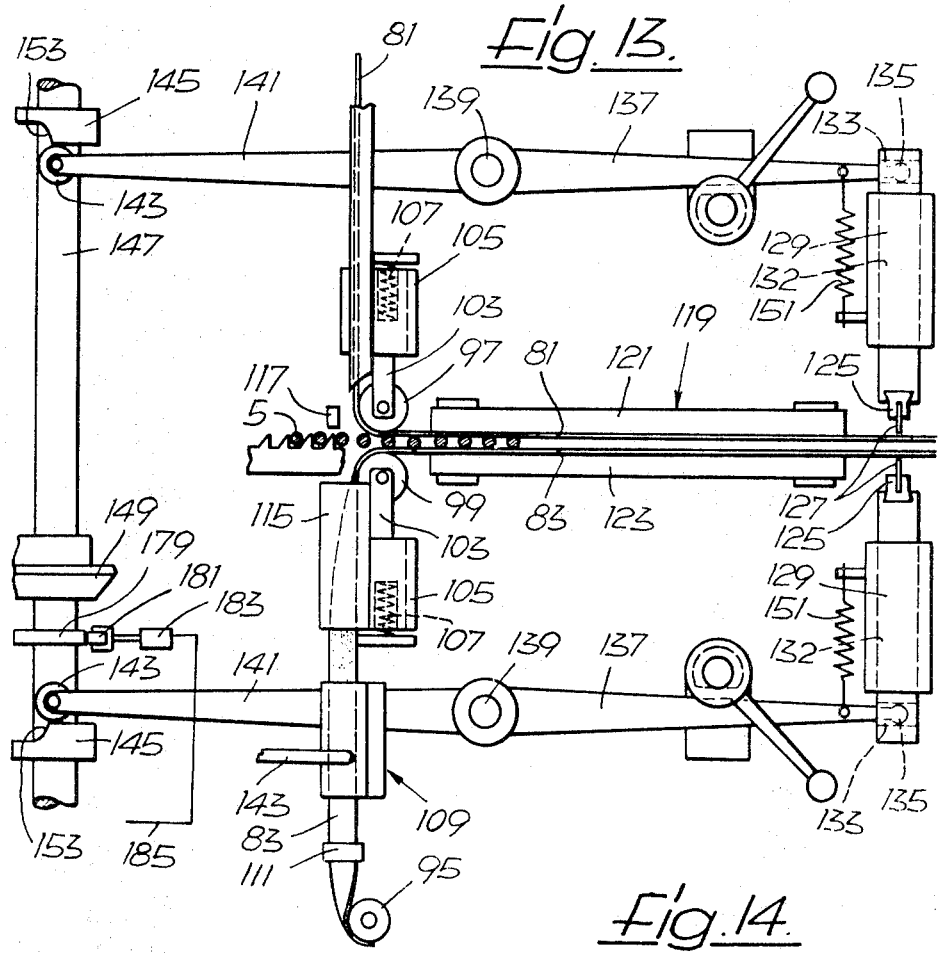

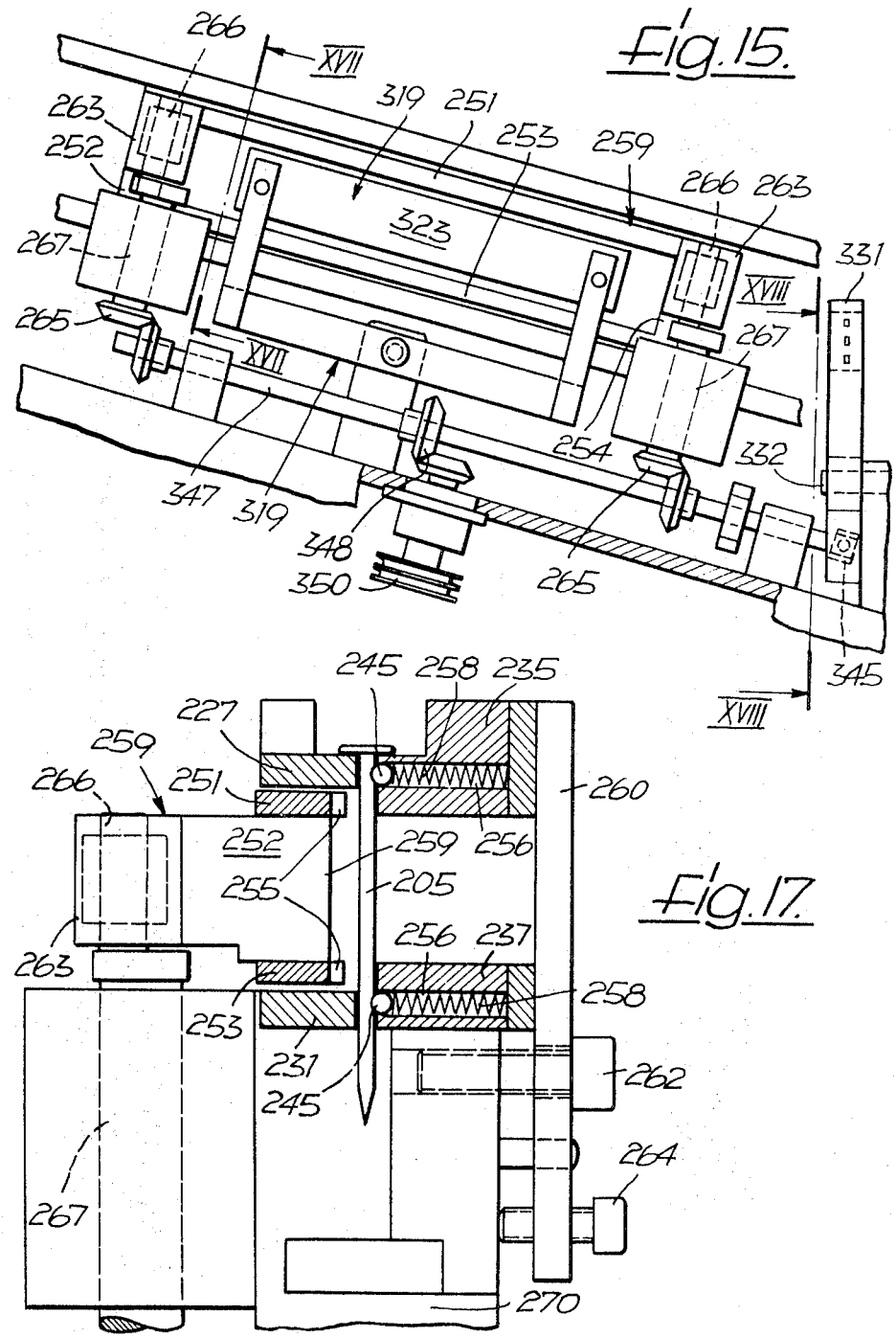

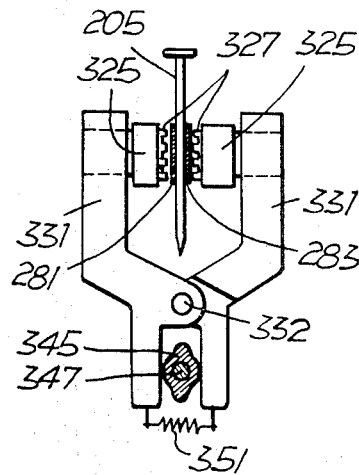
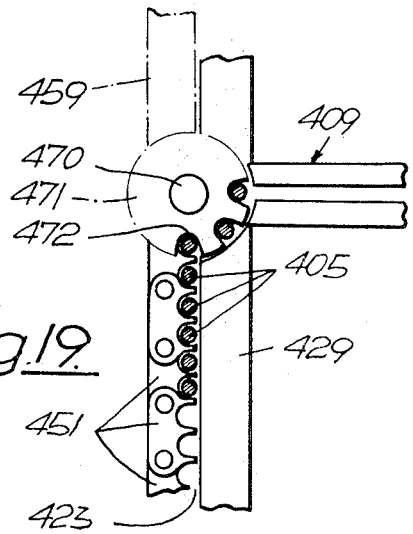
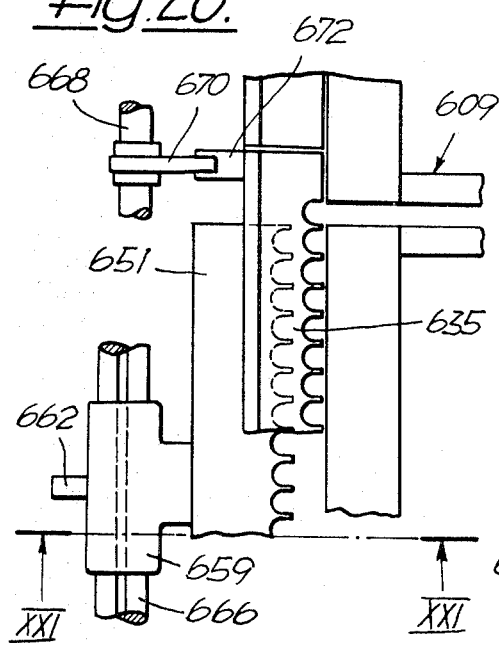
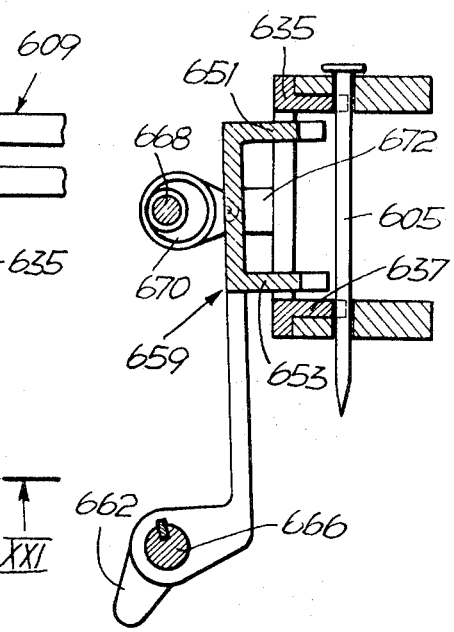
Inventor:
Johannes MOHR
by: Arthur O. Klein
his Attorney

APPARATUS FOR PRODUCING FASTENER STRIPS

The present invention relates to an apparatus for producing a strip-shaped set of fasteners which consists of a row of parallel fasteners laterally adjacent to each other and of at least one connecting strip which holds these fasteners together.

It is an object of the present invention to provide such an apparatus for producing strip-shaped sets of fasteners, for example, nails, in a fully automatic and continuous operation and to design this apparatus so as to be of the simplest possible construction.

For attaining this object, the present invention provides a new apparatus which comprises a combination of the following features:

a. A fastener aligning appliance of a type known as such which assembles and aligns the individual fasteners in a row along a rail track in parallel alignment with each other;

b. A conveying mechanism which, after the fastenings have been removed from the rail track of the aligning appliance, conveys them in a row in which the adjacent fasteners are maintained at a predetermined distance from each other;

c. A heating appliance for heating the fasteners;

d. An appliance for feeding at least one connecting strip having a thermoplastic adhesive thereon to the row of fasteners in the conveying mechanism;

e. A compressing appliance for pressing the connecting strip against the row of heated fasteners in the conveying mechanism;

f. An appliance for inserting a filler into the gaps between the adjacent shanks of the row of fasteners;

g. A cooling appliance for cooling the fasteners including the adhesive which holds the fasteners together with the connecting strip;

h. A perforating appliance for perforating the connecting strip between the individual fasteners; and i. A cutting appliance for cutting the continuously produced fastener strip into sections of a certain length.

According to the feature (a) of the invention as enumerated above, the fasteners are assembled and aligned in a row along a rail track from which they are then removed and conveyed in a row by the conveying mechanism according to the feature (b), in which the adjacent fasteners are maintained at predetermined distances from each other, whereupon by means of the feeding appliance according to the feature (d) the connecting strip is supplied to the row of fasteners in the conveying mechanism and by means of the filler which is inserted between the fasteners by the appliance according to the feature (f), the fasteners are then attached to the connecting strip and to each other in the row as regulated by the conveying mechanism. The heating appliance according to the feature (c) and the compressing appliance according to the feature (e) effect an intimate connection of the connecting strip, which may be provided with an adhesive coating, with the fasteners and the filler. The subsequent cooling appliance according to the feature (g) is provided for the purpose of curing or hardening the filler and, if provided, the adhesive as quickly as possible before the completed fastener strip leaves the apparatus. The perforating appliance according to the feature (h) thereafter perforates the fastener strip between the adjacent fasteners so as to permit them to be easily severed individually from the fastener strip, for example, in a nailing machine. The cutting appliance according to the feature (i) finally cuts the continuously produced fastener strip automatically into separate sections of the desired length.

According to one preferred embodiment of the invention the new apparatus is provided with a conveying mechanism which is designed so as to shift the row of fasteners in a step-by-step movement and comprises at least one driving jaw which is adapted to be reciprocated in the conveying direction of the fasteners and at a right angle to the conveying direction. The conveying mechanism further comprises a ratchet bar which in this embodiment of the invention is provided with locking elements which are adapted to engage between the adjacent fasteners so as to hold them in a fixed position between the individual conveying steps.

According to another advantageous embodiment of the invention, the conveying mechanism for shifting the row of fasteners in a step-by-step movement comprises at least one link chain which is movable within a plane extending at right angles to the shanks of the row of fasteners and one stringer of which extends laterally adjacent to this row. The links of this chain form driving jaws by being provided in their side facing the row of fasteners with recesses into which the fasteners engage so as to be taken along by the movement of the chain in the conveying direction.

Another feature of the invention consists in the provision of a slide member which is intermittently driven in timed relation to the movements of the driving jaw and is adapted to receive one fastener after another from the end of the rail track along which the fasteners are supplied and then to push each fastener to the position in which it may be gripped and taken along by the driving jaw. This slide member may either be moved in a straight direction or it may be provided in the form of a small disk which is given a step-by-step rotation and the peripheral surface of which is provided with equally spaced recesses for receiving the fasteners from one rail track and delivering them to the other.

The aforementioned as well as additional features and advantages of the present invention will become further apparent from the following detailed description thereof which is to be read with reference to the accompanying diagrammatic drawings, in which FIG. 1 shows a side view of an apparatus according to a first embodiment of the invention;

FIG. 2 shows an enlarged view of a part of the apparatus according to FIG. 1, as indicated therein by the numeral II;

FIG. 3 shows an enlarged partial cross section which is taken along the line III—III of FIG. 1;

FIG. 4 shows a partial cross section which is taken along the line IV—IV of FIG. 3;

FIG. 5 shows a top view of the apparatus according to FIG. 1;

FIG. 6 shows, partly broken off and in section, a perspective view of a conveying mechanism of the apparatus according to FIGS. 1 and 5;

FIGS. 7 and 8 show top views of the part of the apparatus in which a pair of nail supply rails terminate into the conveying mechanism according to FIG. 6, and in which each view shows a slide member for pushing the individual nails into the conveying mechanism in a different operating position;

FIGS. 9 and 10 show cross sections which are taken along line IX—IX of FIG. 7 and along line X—X of FIG. 8 respectively;

FIG. 11 shows a partial view of the part of the apparatus as seen in the direction of the arrow XI in FIG. 7;

FIG. 12 shows a detail view of the slide member as shown in FIG. 11, but in the position as shown in FIG. 7;

FIG. 13 shows a top view of the appliances for feeding the connecting strips and pressing them against the row of fasteners in the conveying mechanism and for perforating the connecting strips;

FIG. 14 shows a view of a cutting appliance as seen in the direction of the arrow XIV in FIG. 5;

FIG. 15 shows a partial side view of the conveying mechanism according to a second embodiment of the invention;

FIG. 16 shows a partial top view of the conveying mechanism according to FIG. 15;

FIG. 17 shows an enlarged cross section which is taken along the line XVII—XVII of FIG. 15;

FIG. 18 shows a cross section which is taken along the line XVIII—XVIII OF FIG. 15;

FIG. 19 shows a top view similar to FIG. 7 of a conveying mechanism according to a third embodiment of the invention;

FIG. 20 shows a top view similar to FIG. 8 of a conveying mechanism according to a fourth embodiment of the invention; while FIG. 21 shows a cross section which is taken along the line XXI—XXI of FIG. 20.

Referring first to FIGS. 1 to 14 of the drawings, the apparatus according to the first embodiment of the invention, as may be seen particularly in FIG. 1, comprises a fastener assembling and aligning appliance 1 of a conventional type into which the fasteners which in this case consist of headed steel nails are inserted in bulk. By means of a shaking mechanism, these nails are then conveyed upwardly in a row along a spirally shaped rail track and then into a rail track 3 which extends out of the aligning appliance 1 at the upper edge thereof. From the rail track 3 the nails 5 then pass into a downwardly inclined rail track 7 in which they slide downwardly. This rail track, 7 is also of a conventional type and consists of two bars which are located at both sides of the nail shanks and are spaced at such a small distance from each other that the heads of the nails will rest on the two bars. This rail track 7 is provided with a step 8, as shown in FIG. 2, which insures that subsequent to this step the nails will always be aligned in a row in such a manner, as shown at the lower end of FIG. 3, that the head of each nail rests partly on the head of the nail in front of it.

Between the aligning appliance 1 and the step 8 a photoelectric gate is provided which consists of a light source 10 and a photoelectric cell 12 and is adapted to interrupt the operation of the aligning appliance 1 when a nail 5 remains for a longer period within the path of the light beam coming from the light source 10, so that no further nails 5 will be supplied to the rail track 7. This photoelectric gate thus insures that the aligning appliance 1 will not operate unnecessarily when the rail track 7 is filled with nails up to this gate 10, 12. When the nail which has remained in the path of the light beam of the light source 10 finally passes out of this path, the aligning appliance 1 will again be switched on and feed further nails into the rail track 7 until the light beam of the light source 10 will again be interrupted by a nail 5 remaining within its path.

As illustrated particularly in FIG. 5, rail track 7 is bent at a right angle. Its lower section 9 subsequent to this angle passes along an electric inductive heating appliance 11 the current loops 13 of which extend parallel to the row of nails 5 which is located within the rail section 9.

For insuring that the nails in rail track 7 and especially those in the lower rail section 9 will be properly guided, this rail track consists not only of the upper rail bars 15 and 17 on which the nail heads engage, but also of a pair of lower rail bars 19 and 21 (FIGS. 3 and 4). Rail bar 19 which is closest to the current loops 13 consists of an electrically nonconductive material, preferably of a ceramic tube.

As may be seen particularly in FIGS. 7 and 8, the lower rail section 9 terminates into a rail track 23 which extends at a right angle to the rail section 9 and forms a part of a conveying mechanism 25 as generally indicated in FIG. 1. This conveying mechanism 25 which is shown in detail in FIGS. 8, 9, and 10 is provided like the rail track 7 with two pairs of rail bars 27, 29 and 31, 33 which are rigidly mounted in the machine housing. Rail bars 27 and 29 support the heads of the nails 5. Directly adjacent but extending transverse to the rail bars 27 and 31 are two racks 35 and 37 which serve as ratchet bars and are provided with elongated holes 39 (FIG. 7) which extend at right angles to the conveying direction of the conveying mechanism 25. Into these holes 39 pins 41 engage which are mounted in fixed positions so that the horizontally extending racks 35 and 37 are movable against the action of springs 43 in a direction at right angles to the conveying direction of the nails. Since these springs 43 are tension springs, the tips of the teeth 45 of racks 35 and 37 will be pressed against the opposite bars 47 and 49 which are secured in a fixed position relative to the housing of the machine and carry the rail bars 29 and 33. The teeth 45 are designed so that each tooth gap takes up one of the nails 5, while the flanks of these teeth are inclined so that at each positive movement of the nails 5 by one step in the conveying direction of the conveying mechanism, racks 35 and 37 will be lifted by the nails 5 off the bars 47 and 49 against the action of spring 43 so that the nails will be shifted within each conveying step into the next tooth gap. The other tooth flank at the side of each tooth gap opposite to the conveying direction extends at a right angle to the conveying direction so that any movement of the row of nails in the direction opposite to the conveying direction will be prevented by the teeth 45 of racks 35 and 37. Due to this construction of racks 35 and 37 which serve as ratchet devices, they do not need any special driving means since the row of nails 5 only needs to be advanced step-by-step in order to effect the necessary movement of the racks 35 and 37 from their locking position to the releasing position.

For conveying the now of nails 5 along the rail track 23, a row of rack-shaped driving jaws 51 and 53 are provided between and directly adjacent to the racks 35 and 37. The teeth 55 of these driving jaws are of the same shape as the teeth 45 of racks 35 and 37. These driving jaws 51 and 53 are movable against the action of springs 57 at right angles to the conveying direction from their position in which they engage between the nails 5 to a position in which they are disengaged from the nails, and they are connected to a slide member 59 which is movable back and forth in the conveying direction. As shown in FIG. 11, slide member 59 is connected by a connecting rod 61 to a ring 63 which is eccentrically rotatable on a shaft 67 which may be driven by a bevel gear 65 so that at each revolution of shaft 67 slide member 59 will carry out a reciprocating movement of a length which corresponds to the distance between the teeth 45 or 55. Consequently, when the jaws 51 and 53 move in the conveying direction, they will take along the row of nails 5, while racks 35 and 37 will then be lifted off the bars 47 and 49. Due to the particular shape of their teeth 55 and their engagement with the nails 5, jaws 51 and 53 will slide out of the row of nails during the return movement of these jaws until at the end of the return movement of slide member 59 the teeth of jaws 51 and 53 will again engage between the nails 5. This insures that the nails 5 will always be held together in the form of a continuous row between the rail bars 27, 29, 31, and 33 and will be advanced step by step.

In order to draw the nails from the end of the rail section 9 into the rail track 23 of the conveying mechanism 25, an electromagnet 69, as shown in FIG. 3, is provided in a position opposite to the end of the rail section 9. Since the driving jaws 51 and 53 are moved back and forth in the conveying direction by the crank drive of slide member 59 and jamming of the individual nails could occur at their point of transfer from the rail section 9 to the rail track 23, an additional slide member 71 is provided as shown particularly in FIGS. 11 and 12, which prevents any jamming of the nails which might result in damage to the rails. This slide member 71 is drawn by a traction spring 73 in the conveying direction and is moved back against the action of spring 73 by an eccentric wheel 75 on shaft 67 so as to free the end of the rail section 9 which terminates into the rail track 23. Slide member 71 is for this purpose provided with a lug 77 on which a cam follower roller 79 is mounted. In FIG. 7, slide member 71 is illustrated in its retracted position in which it frees the end of rail section 9. In this position, the last nail 5 in rail section 9 is drawn into the rail track 23 by the electromagnet 69 (FIG. 3) and at the same time, the first tooth of each of the two driving jaws 51 and 53 as well as the first teeth of the racks 35 serving as ratchet bars are located behind the next following second nail in rail track 23. The further rotation of shaft 67 then moves the slide member 59 to its most forward position. At the same time the eccentric wheel 75 disengages from the cam follower roller 79 so that by the action of spring 73 slide member 71 will be moved forward one step, so that the first nail which has just been advanced from the rail section will be shifted to the position of the second nail. As soon as this nail has reached this position, it will be arrested by the return of racks 35 and 37 to their locking position. This return movement of racks 35 and 37 will not be obstructed by slide member 71 since the latter may be moved back for the required distance against the action of spring 73.

This position of slide member 71 is illustrated in FIGS. 8 and 11. Immediately thereafter, slide member 59 is again moved back by the crank drive and at the same time the eccentric wheel 75 moves the slide member 71 against the action of spring 73 back to its retracted position as illustrated in FIG. 7, so that the next nail 5 can then pass out of the open end of the rail section 9.

Rails 27 and 31 which are located at one side of rail track 23 and the other parts of the conveying mechanism 25 which are located at this side are mounted in parts of the housing of the apparatus which are removable from the other parts of this housing for opening the rail track to permit any causes of interferences to be removed and the rail track to be easily cleaned.

Within the first third of the conveying mechanism 25, that is, within the area between the driving jaws 51 and 53, a pair of connecting strips 81 and 83 is fed to the two sides of the row of nails 5 which is held within the conveying mechanism 25. These connecting strips 81 and 83 consist of paper and are provided on the side facing the nails 5 with a coating of a thermoplastic adhesive which, when pressed against the nails 5 which have been heated by the heater 11, becomes soft and sticky so that the connecting strips will be firmly connected to the nails.

Each of the two feed mechanisms for the connecting strips 81 and 83 has a pin 85 or 87 on which coil 89 or 91 is rotatable on which a long connecting strip 81 or 83 is wound. These connecting strips 81 and 83 are then passed over guide rollers 93 and 95 to pressure rollers 97 and 99 which change the direction of movement of the connecting strips in the conveying direction and press the thermoplastic-coated side of these strips against the row of nails which are held in the conveying mechanism. As illustrated in FIG. 13, the pressure rollers 97 and 98 are rotatably mounted between the bifurcated ends of piston rods 97 and 99 which are slidable in cylinders 105 in which compression springs 107 are mounted which press the rollers 97 and 99 against the nails 5 which are held in the conveying mechanism 25.

Between guide roller 95 and pressure roller 99 a device 109 is provided for applying a filler upon the side of the connecting strip 83 which is coated with a layer of a thermoplastic adhesive. This filler may consist of a foamy substance which, when the connecting strip 81 is pressed against the row of nails 5 which is held in the conveying mechanism penetrates between the shanks of the adjacent nails and partly fills the space between them. As illustrated diagrammatically in FIG. 6, this applicating device 109 comprises a guide roller 111 which turns the connecting strip 83 from a vertical plane in which it arrives from its source of supply to a horizontal plane. The applicating device 109 further comprises a nozzle 113 which applies the filler upon the then horizontal side of the connecting strip 83 which is provided with the coating of thermoplastic adhesive. Behind nozzle 113, a guide element 115 is provided on the uncoated side of the connecting strip 83. This guide element 115 forms a guide surface which turns the connecting strip again to a vertical plane and conducts it to the pressure roller 99. Immediately adjacent to the pressure roller 97 (FIG. 13) a thermistor 117 is provided which controls the heating appliance 11 and insures that the nails 5 when passing into the compressing appliance formed by the rollers 97 and 99 will always have the temperature which is required for softening the layers of thermoplastic adhesive on the connecting strips 81 and 83.

Directly following the pressure rollers 97 and 99, the conveying mechanism is provided with a cooling appliance 119 which comprises a pair of pressure plates 121 and 123 (FIG. 13) which are applied with a light pressure upon the uncoated outer sides of the connecting strips 81 and 83 and cool and harden the thermoplastic layers which were softened by the heat of the nails so that the connecting strips 81 and 83 and the nails 5 are then firmly connected to each other.

Following the cooling appliance 119, each connecting strip 81 and 83 is acted upon by a separate perforating appliance. Each of these two perforating appliances comprises a needle holder 125 is which a row of needles 127 is mounted the axes of which extend perpendicular to the connecting strips 81 and 83. The needle holder 125 is secured to one end of a rod 132 which is slidable in its axial direction in a cylinder 129 and the axis of which extends perpendicular to the plane of the associated connecting strip 81 or 83 while the other end of rod 132 is provided with an aperture 133 which extends transverse to the axis of the rod and into which a roller 135 engages which is rotatable on the end of an arm 137 of a two-armed lever 137, 141 which is pivotable about an axis 139. The end of the other arm 141 of this lever likewise carries a roller 143 which, however, engages upon a cam plate 145. This cam plate 145 is mounted on a shaft 147 which is driven by a motor not shown, and also by means of a bevel gear 149 which also drives the bevel gear 65 on shaft 67, as already mentioned above with reference to FIG. 11. Cylinder 129 is mounted in a fixed position relative to the housing of the apparatus and is connected to the arm 137 by a tension spring 151 which always tends to press the needle holder 125 against the adjacent connecting strip 81 or 83 so as to perforate the same by means of the needles 127. This movement is controlled by cam plate 145 against which the roller 143 is pressed by the action of spring 151. The flange surface of cam plate 145 is provided with a recess 153 which permits the two-armed lever 137, 141 to pivot about its axis 139 so that the needles 127 may then perforate the adjacent connecting strip 81 or 83. This recess 153 is located in such a position that roller 143 will always drop into this recess when the movement of the row of nails 5 is stopped, while the perforating appliance is located in such a position relative to the teeth of racks 35 and 37 which serve as ratchet bars that the needles 127 will always penetrate exactly into the gap between the shanks of two adjacent nails 5 and thus produce at each of these points a place where the completed nail strip may be easily severed.

Following the perforating device, the apparatus is provided with a second cooling appliance 155, as illustrated in FIG. 5, which comprises a blower 157 which blows a cooling current against the nails 5 which are held together by the connecting strips and also blows off the dustlike particles which result from the perforating operation.

This second cooling appliance 155 is followed by two feed rollers 159, as also shown in FIG. 5, which engage upon the connecting strips 81 and 83 and are driven in conformity with the movements of the conveying mechanism 25. The row of nails which is held together by the connecting strips 81 and 83 and is clamped between these feed rollers 159 is therefore moved in the conveying direction at the same cycle as that of the movements of the conveying mechanism.

Immediately following these two rollers 159, there is a cutting appliance 161 by means of which the continuous nail strip as previously produced is cut off into individual nail strips of a certain length. This cutting appliance, as illustrated more particularly in FIG. 14, comprises a cutting blade 163 which is pivotable about an axis 169 against the action of a spring 171 by being pivotably connected to a blade holder 167 which is slidable along the plane of the blade and guided in a guide element 165. Spring 171 therefore normally maintains the blade 163 within the cutting plane. The pivotability of blade 163 however, permits the blade to escape damage in the event that it might hit upon the shank of a nail 5. A tension spring 173 tends to maintain the blade holder in the inactive position as shown in FIG. 14, in which blade 163 is retracted from the row of nails 5 which is held together by connecting strips 81 and 83. At its rear end, blade holder 167 is connected to a plunger-type armature 175 of an electromagnet 177 which is switched on whenever a certain number of conveying steps in accordance with the desired length of a nail strip have been carried out and which then cuts off the nail strip. For counting the number of conveying steps, shaft 147 (FIG. 13) carries a cam plate 179 on which a feeler roller 181 of a counter 183 engages which is connected by a control line 185 to a relay, not shown, which is adapted to switch on the electromagnet 177.

The mode of operation of the apparatus as illustrated in FIGS. 1 to 14 is as follows: From the nail assembling and aligning appliance 1 nails 5 are fed continuously to the rail track 7 until when the conveying movement is interrupted, the last nail of the row interrupts the light beam of the light source 10 and thereby stops the operation of the aligning appliance 1 until it is actuated again at a certain time after the last nail has passed out of the light beam. Whenever the slide member 71 has been retracted by the eccentric wheel 75 to its releasing position, each nail 5 which reaches the front end of rail section 9 is drawn into the rail track 23 of the conveying mechanism 25 by the magnet 69 which is preferably provided in the form of a permanent magnet. At the next forward stroke of the conveying mechanism 25, the nail which is then the last in the rail track 23 is advanced one step by slide member 71 into the first tooth gap of racks 35 and 37 which due to the forward movement of the row of nails which are presently in the conveying mechanism 25, are then in their retracted position, as illustrated in FIG. 8. Simultaneously with the forward movement of slide member 71, the driving jaws 51 and 53 are also moved forwardly by slide member 59 which is driven by the crank drive 61, 63. At the end of this forward stroke, racks 35 and 37 are moved to their locking position in the tooth gaps in which also the last nail which has just been fed by the slide member 71 is arrested by the last teeth of racks 35 and 37. During the following return movement of slide member 59, the driving jaws 51 and 53 are retracted by sliding off the shanks of the row of nails, as indicated in FIG. 8, due to the particular shape of their teeth 55, and at the end of the stroke they again move to the position in which their teeth 55 engage between the shanks of the row of nails 5. At the same time, slide member 71 is retracted by the eccentric wheel 75 to the position behind the end of rail section 9 so that a new nail will be drawn by the magnet 69 from the rail section 9 into the nail track 23. The row of nails 5 which is thus advanced step by step in the conveying mechanism 25 and which is heated by the heating appliance 11 is then supplied with the connecting strips 81 and 83 which are glued together with the nails 5 in the manner as previously described. The foamy substance which is then supplied through the nozzle 113 of the applicating device 109 then partly fills the gap between the two connecting strips 81 and 83 and the shanks of the nails 5 and hardens in the cooling appliance 119 together with the thermoplastic adhesive with which the connecting strips 81 and 83 are coated so that, when the nails pass out of the cooling appliance 119, they are firmly connected to each other by the connecting strips 81 and 83. The connecting strips 81 and 83 are then perforated by the perforating appliance 125, 127 between each pair of adjacent nail shanks so that in a nailing machine the individual nails may be easily severed from each other. In the following second cooling appliance 155 the thermoplastic adhesive and the foamy substance together with the nails 5 are further cooled and at the same time the dustlike particles which are punched out of the perforations are removed. The row of nails 5 which are held together by the connecting strips is then passed by the feed rollers 159 to the cutting appliance 161 which cuts off the nail strips at the desired length.

While the driving jaws 51 and 53 of the apparatus as described with reference to FIGS. 1 to 14 are located at the same side as the racks 35 and 37, which serve as ratchet bars, the latter may also be provided on the side opposite to the driving jaws. Such a modification is illustrated by way of example in FIGS. 15 to 18, in which all those parts which correspond to those as described with reference to FIGS. 1 to 14 and therefore do not need to be described again, are designated by reference numbers which are increased by 200 over the numerals as previously used.

The modification of the apparatus as illustrated in FIGS. 15 to 18 differs from the embodiment according to FIGS. 1 to 14 merely by the particular construction and arrangement of the ratchet bars 235 and 237, by the manner of driving the slide member 259 which carries the driving jaws 251 and 253, and by the different construction of the perforating appliance.

As already mentioned above, the ratchet bars 235 and 237 are located at the side opposite to the driving jaws 251 and 253. Ratchet bars 235 and 237 form at the same time the guide rails which are opposite to the guide rails 227 and 231 which are located at the side of the driving jaws 251 and 253. The locking element of ratchet bars 235 and 237 are in this case formed by balls 245 which are disposed within bores 256 which extend at right angles to the rail track 223 (FIG. 16) and in which compression springs 258 are mounted which act upon the balls 245 (FIG. 17). The ends of bores 256 facing the rail track 223 are made of a slightly smaller diameter so as to prevent the locking balls 245 which under the action of the springs 258 project from the bores and engage as locking elements between the shanks of the adjacent nails 205 from being pushed entirely out of the bores. When the nails 205 are moved forwardly by the driving jaws 251, balls 245 will be simply pressed against the action of springs 258 fully into the bores 256. Both locking bars 235 and 237 are secured to a plate 260 which, in turn, is secured to the housing 270 of the machine by screws 262 and 264 and may also be accurately adjusted relative to the housing by means of these screws.

The driving jaws 251 and 253 are rigidly connected to the slide member 259 each end of which carries a bushing 263 in each of which the eccentric end 266 of a shaft 267 is rotatably mounted. The two shafts 267 are connected by bevel gears 265 to a shaft 347 which extends parallel to the rail track 223 and is connected by bevel gears 348 to a pulley 350 which may be driven by a V-belt by a motor, not shown. Slide member 259 is driven in this manner with a circular motion, as indicated in FIG. 16 by the curved arrow 268, so that during the period of this motion in which the teeth 205 of the driving jaws 251 and 253 engage into the rail track 223, the nails 205 will be shifted forwardly one step.

Slide member 259 is also provided in this embodiment of the invention in the form of a rectangular frame the longitudinal arms of which form the driving jaws 251 and 253 which are held together by transverse arms 252 and 254 which carry the bushings 253. At the inside of the area which is enclosed by the framelike slide member 259 a cooling appliance 319 is mounted which consists of two opposite pressure plates 323, only one of which is visible in FIG. 15.

The perforating appliance as illustrated in FIG. 15 and more particularly in FIG. 18 comprises two two-armed levers 331 which are pivotable about a common axis 332. The ends of one pair of arms of levers 331 carry holders 325 for perforating pins 327, while the other arms of these levers are pressed toward each other by a spring 351 and thus against a cam plate 345 which is mounted on the shaft 347. When this shaft 347 is rotated, the arms of levers 331 at the opposite sides of cam plate 345 will be pressed apart by the latter in timed relation to the operation of the conveying mechanism so that the other arms carrying the perforating pins 327 will be pressed against each other and the needles 327 will thereby perforate the connecting strips 281 and 283.

In all other respects, the construction and operation of the apparatus according to FIGS. 15 to 18 correspond to those of the apparatus according to FIGS. 1 to 14 so that there is no need for any further description.

FIG. 19 illustrates a further modification of the apparatus according to the invention. All those parts which correspond to those as described with reference to FIGS. 1 to 18 have not been described again. All other parts having equivalent functions to parts illustrated in FIGS. 1 to 14 are designated by reference numbers increased by 400 over those used in corresponding parts in FIGS. 1–14. The apparatus of FIG. 19 differs from the apparatus as previously described only by the fact that the driving jaws are formed by the links 451 of a chain 459 which moves within a plane transverse to that of the shanks of the row of nails 405, that is in FIG. 19 within the plane of the drawing, so as to shift these nails step by step forwardly and one stringer of which, as shown in FIG. 19, extends adjacent to one side of the row of nails. Of course, similarly as described with reference to the previous embodiment of the invention it is also possible to provide two chains 459 at a distance from and above each other. Chain 459 carries the nails 405 along at least one guide rail 429.

In place of the slide member 71 of the first embodiment of the invention as illustrated in FIGS. 11 and 12, the apparatus according to FIG. 19 is provided with a rotatable disk 471 which may be driven intermittently about its axis 470 and is provided with recesses 472 in its outer edge which are peripherally spaced equally from each other and are adapted to receive the nails 405 from the end of the rail section 409 and to convey them into the nail channel 423. The means for connecting the disk 471 to the drive shaft are designed so as to insure that disk 471 will always be turned one further step when chain 459 has completed one forward step so that a new nail will then be pushed by disk 471 into the next empty tooth gap of a chain link 451. In all other respects, this embodiment of the invention is designed exactly like the two embodiments as previously described.

In the further embodiment of the invention as illustrated in FIGS. 20 and 21 the reference numbers have been increased by 600 relative to equivalent parts with reference numbers in FIGS. 1–14. In this embodiment not only the slide member 659 which carries the driving jaws 651 and 653, but also the ratchet bars 635 and 637 are moved positively. Slide member 659 is for this purpose mounted on a shaft 666 so as to be nonrotatable but axially slidable relative thereto, while shaft 666 may be turned back and forth about its axis at an angle sufficient to remove the driving jaws 651 and 653 from the row of nails 605 or to apply them thereon, respectively. At the same time, a slide member, not shown in the drawings, engages upon a radially projecting arm 662 on slide member 659 and moves the latter back and forth along shaft 666. These two motions of slide member 659 are associated with each other so as to produce a movement of this member along a rectangular path in which the slide member 659 first pivots the driving jaws 651 and 653 so that their teeth engage between the shanks of the row of nails 605, then moves the driving jaws longitudinally so as to shift the row of nails one step then pivots back the driving jaws 651 and 653 so as to disengage them from the nails, and then returns the jaws to their original position. Thereafter the same operation is repeated so that the teeth of the driving jaws again engage between the nail shanks and move the nails 605 the next step forwardly. The locking bars 635 and 637 are likewise positively driven by a shaft 668 on which a ring 670 is eccentrically mounted which by means of a connecting rod 672 engages upon the locking bars 635 and 637 so that during the rotation of shaft 668 the locking bars will first be retracted from the row of nails 605 and will then again be moved toward the nails. Shaft 668 is connected to the other driving means of the machine in such a manner that the locking bars 635 and 637 will engage upon the nails when the driving jaws 651 and 653 are retracted from the nails and that the locking bars 635 and 637 will disengage from the nails only while the driving jaws 651 and 653 move the row of nails forwardly. In all other respects, this embodiment of the invention corresponds essentially to the embodiments as previously described and therefore does not require any additional description.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. An apparatus for continuously producing faster strips, comprising in combination, a rail track, means for continuously assembling and aligning individual fasteners in a row and feeding them to and along said rail track, conveying means for receiving said fasteners from the end of said rail track and further conveying them in a second row in which said fasteners are spaced at a predetermined distance from each other, said conveying means comprising means for shifting said fasteners of said second row in a step-by-step movement in a forward conveying direction, said shifting means of said conveying means comprising at least one driving jaw, means for reciprocating said driving jaw in said conveying direction and in the direction at a right angle thereto, at least one ratchet bar having locking elements thereon, means for moving said locking elements from a retracted position in which said fasteners of said second row are movable in steps in said conveying direction towards said fasteners to a position in which said elements engage between the adjacent fasteners so as to hold them in a fixed position during the intervals between said steps, means for heating said fasteners of said second row, means for feeding at least one thin connecting strip to said second row in said conveying means, said connecting strip having a coating of a thermoplastic adhesive on its side facing said second row, compressing means for pressing said connecting strip against said row of fasteners in said conveying means so as to form a continuous fastener strip, means for cooling said fastener strip and for thereby hardening said coating, means for perforating said connecting strip between the adjacent fasteners of said fastener strip, means for inserting a filler into the gaps between the adjacent fasteners of said second row so as to at least partly fill said gaps, and means for cutting said continuous fastener strip into sections of a predetermined length.

2. An apparatus as defined in claim 1, in which said driving jaw is provided in the form of a rack.

3. An apparatus as defined in claim 1, in which said ratchet bar is provided in the form of a rack having teeth forming said locking elements, said means for moving said locking elements toward and between said fasteners comprising resilient means, said locking elements being moved to said retracted position against the action of said resilient means when said fasteners of said second row are moved in said conveying direction by said driving jaw.

4. An apparatus as defined in claim 1, in which said ratchet bar has plurality of bores, a compression spring in each of said bores, each of said locking elements consisting of a member having a round surface adapted to engage under the action of said spring between said adjacent fasteners and to be depressed against the action of said spring into said bore when said fasteners of said second row are moved in said conveying direction by said driving jaw.

5. An apparatus as defined in claim 1, in which said driving jaw and said ratchet bar are located at the opposite sides of said second row of fasteners.

6. An apparatus as defined in claim 1, in which said driving jaw and said ratchet bar are located at the same side of said second row of fasteners.

7. An apparatus as defined in claim 1, in which at least two of said driving jaws and at least two of said ratchet bars are provided and said driving jaws as well as said ratchet bars are spaced from each other in the axial direction of said fasteners.

8. An apparatus as defined in claim 1, in which said shifting means further comprise a slide member movable in timed relation with said driving jaw and adapted to receive one fastener at a time from the end of said first rail track and to push it to a position in which it will be engaged by said driving jaw.

9. An apparatus as defined in claim 1, in which said slide member consists of a rotatable disk having recesses equally spaced from each other in its peripheral surface, and means for driving said disks in a step-by-step movement about its axis.

10. An apparatus as defined in claim 1, in which said heating means consist of an inductive heating appliance for heating said fasteners.

11. An apparatus as defined in claim 10, in which at least the part of said second rail track near said heating means consists of an electrically nonconductive material.

12. An apparatus as defined in claim 1, in which said compressing means comprise an element for pressing said connecting strip against said row of fasteners and also serving as said cooling means.

13. An apparatus as defined in claim 1, further comprising a magnet adjacent to the end of said first rail track for drawing the next fastener out of said end and into said conveying means.

14. An apparatus as defined in claim 1, in which each of said fasteners within said apparatus has a longitudinal axis extending substantially in a perpendicular direction, said filler inserting means comprising an applicating device adapted to emit said filler in a substantially perpendicular direction, means for guiding said connecting strip so as to pass in a substantially horizontal plane underneath and past said applicating device to receive said filler on one side thereof, and means for then turning said connecting strip so that said side carrying said filler faces said fasteners when said connecting strip is then applied upon said row of fasteners and passes with the latter into said compressing means.

15. An apparatus as set forth in claim 1, in which said conveying means comprise a second rail track consisting of at least two parallel rails for guiding said fasteners of said second row.